US006082266A

United States Patent [19]
Auzins et al.

[11] Patent Number: 6,082,266
[45] Date of Patent: Jul. 4, 2000

[54] AIR-CUSHION AND ACCURATE MINE LAYING AND MAPPING SYSTEM

[75] Inventors: John Auzins; John Horton, both of Panama City; David Vickers, Lynn Haven; William Jones, Panama City Beach, all of Fla.

[73] Assignee: The United States of America as represented by the Secretary of the Navy, Washington, D.C.

[21] Appl. No.: 09/006,523

[22] Filed: Jan. 13, 1998

Related U.S. Application Data

[63] Continuation-in-part of application No. 08/673,890, Jul. 1, 1996, Pat. No. 5,708,230.

[51] Int. Cl.$^7$ .............................. F42B 22/00; B63G 6/00
[52] U.S. Cl. ........................ 102/411; 102/406; 102/409
[58] Field of Search ............................ 89/1.13; 102/401, 102/406, 407, 411, 409, 412

[56] References Cited

U.S. PATENT DOCUMENTS

| | | | |
|---|---|---|---|
| 3,583,520 | 6/1971 | Kirpitznikoff | 180/117 |
| 4,183,301 | 1/1980 | Burke et al. | 102/411 |
| 4,290,500 | 9/1981 | Hopkins et al. | 180/117 |
| 4,633,778 | 1/1987 | Joner et al. | 102/411 |
| 4,660,492 | 4/1987 | Schlichthorst et al. | 114/67 A |
| 4,821,829 | 4/1989 | Gilbert et al. | 180/127 |
| 5,005,482 | 4/1991 | Reams | 102/420 |
| 5,458,490 | 10/1995 | Cabana | 434/29 |
| 5,661,258 | 8/1997 | Garcia et al. | 102/402 |
| 5,688,124 | 11/1997 | Salzeder | 434/11 |
| 5,708,230 | 1/1998 | Woodall, Jr. et al. | 102/402 |
| 5,951,607 | 9/1999 | Senn et al. | 701/1 |

*Primary Examiner*—Harold J. Tudor
*Attorney, Agent, or Firm*—Harvey A. Gilbert; Donald G. Peck

[57] ABSTRACT

An apparatus for and method of laying a minefield in open water uses a high speed air-cushion vehicle that transports substantial quantities of mines to a target area. It then deploys the mines while it is rapidly moving, and marks and records the location of each deployed mine with GPS equipment. Mines can be emplaced at speeds and rates much greater than conventional surface ships. The speed of high speed aircushion vehicle makes it less vulnerable to attack during operations, and it is less vulnerable to other mines it may encounter during a mission. The GPS on high speed air-cushion vehicle ensures an accurate and detailed record of location of the minefield. The high speed air-cushion vehicle has much greater lift capability than aircraft used in mining missions, and, therefore, can deliver a much larger payload per sortie (under all weather conditions) while creating the minefield. Mines can be emplaced much more accurately than an aircraft dropping them from altitude, (at least 100% increase in delivery precision). The high speed air-cushion vehicle running at normal operating speeds, has a low detectable signature and, due to its speed, is invulnerable to certain enemy mine functions. The unexpected benefit is accurate mining of enemy minefields, or areas beyond enemy minefields, for various expeditionary uses.

7 Claims, 3 Drawing Sheets

AIR-CUSHION AND ACCURATE MINE LAYING AND MAPPING SYSTEM

CROSS REFERENCE TO RELATED APPLICATIONS

This is a continuation in part of copending U. S. patent application entitled "Ocean Surface-Delivered Ordnance Explosive Mine and Obstacle Clearance System" by Robert Woodall et al., U.S. Patent and Trademark Office Ser. No. 08/673,890 (NC 77,338), filed Jul. 1, 1996, now U.S. Pat. No. 5,708,230, and incorporates all references and information thereof by reference herein.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention is directed to providing an apparatus for and method of laying a minefield in open water. In particular, this invention relates to transporting mines to a target area in an air-cushion vehicle, deploying the mines from the air-cushion vehicle while it is rapidly moving, and recording the location of each deployed mine with GPS equipment.

Laying mines in waterways is always hazardous. The hazard extends to both the vessel or craft that is laying the mines and the friendly vessels that may later pass through the area near the minefield. This is particularly true where the mine laying operation might come under unfriendly surveillance and hostile action. In addition, mines or explosive countermeasures that were previously dispersed in an area may imperil this subsequent mine laying effort.

For obvious reasons, conventional surface craft are vulnerable to these hazards. Therefore, aircraft have been relied upon to lay mines and the use of a high volume mine rack for these aircraft has been advocated. The rack was specifically designed to disburse large quantities of mines from aircraft so that large areas could be mined quickly. This capability was to augment the present use of aircraft and submarines to deploy mines in limited quantities.

However, all deployments of mines from aircraft are subject to large placement errors associated with dropping mines from altitude. These placement errors make it difficult to accurately map the location of emplaced fields of sea mines. Consequently, the aircraft deployments have almost no accurate and acceptable mapping capability. Additionally, even when the location of an enemy minefield is known, no viable capability exists that can accurately seed an enemy minefield with other mines from the air. Aircraft simply cannot deploy mines with enough accuracy to be effective.

Thus, in accordance with this inventive concept, a need has been recognized in the state of the art for an apparatus for and method of laying mines from a rapidly moving air-cushion vehicle and accurately marking their locations with GPS equipment.

SUMMARY OF THE INVENTION

An apparatus for laying mines in water uses an air-cushion vehicle for rapidly transporting mines across water, means to off-load the mines in the water from the air-cushion vehicle while it is rapidly moving, and GPS equipment that records locations of the off-loaded mines. A method of laying mines in water comprises the steps of transporting mines across the water in an air-cushion vehicle, off-loading the mines in the water from the air-cushion vehicle while it is rapidly moving permits recording locations of the off-loaded mines with GPS equipment. An object of the invention is to provide an apparatus for deploying mines and marking their location.

Another object of the invention is to provide an apparatus for emplacing mines at speeds and rates much greater than conventional surface ships.

Another object of the invention is to provide an apparatus for deploying mines that is less vulnerable to hostile action and to previously laid mines.

Another object of the invention is to provide an apparatus for deploying mines and recording the precise location of each deployed mine with onboard GPS mapping equipment.

Another object of the invention is to provide an aircushion craft having GPS equipment for laying mines and marking their location.

An object of the invention is to provide a method of deploying mines and marking their location.

Another object of the invention is to provide a method of emplacing mines at speeds and rates much greater than conventional surface ships.

Another object of the invention is to increase the precision of emplacement of a minefield in water.

Another object of the invention is to increase the accuracy to which a minefield in water is mapped.

Another object of the invention is to increase the speed at which a minefield can be created in water.

Another object of the invention is to provide a method of deploying mines that is less vulnerable to hostile action and previously laid mines.

Another object of the invention is to provide a method of deploying mines and recording the precise location of each deployed mine with onboard GPS equipment.

Another object of the invention is to provide a high speed air-cushion craft having a much greater lift capability than aircraft otherwise used in mining missions to thereby deliver much larger payloads per sortie under all weather conditions.

Another object of the invention is to provide a high speed air-cushion craft having onboard GPS equipment to more accurately mark locations of deployed mines with greater precision than aircraft dropping them from altitude.

Another object of the invention is to provide a high speed air-cushion craft for laying mines and marking their location having low detectable signature and, due to its speed, invulnerability to certain enemy mine functions at depths greater than about 40 feet.

Another object of the invention is to provide a high speed air-cushion craft having GPS equipment for laying mines and marking their location for accurately mining enemy fields of sea mines or areas beyond enemy minefields for various expeditionary purposes.

These and other objects of the invention will become more readily apparent from the ensuing specification when taken in conjunction with the appended claims.

DESCRIPTION OF THE PREFERRED EMBODIMENT

Figure 1:
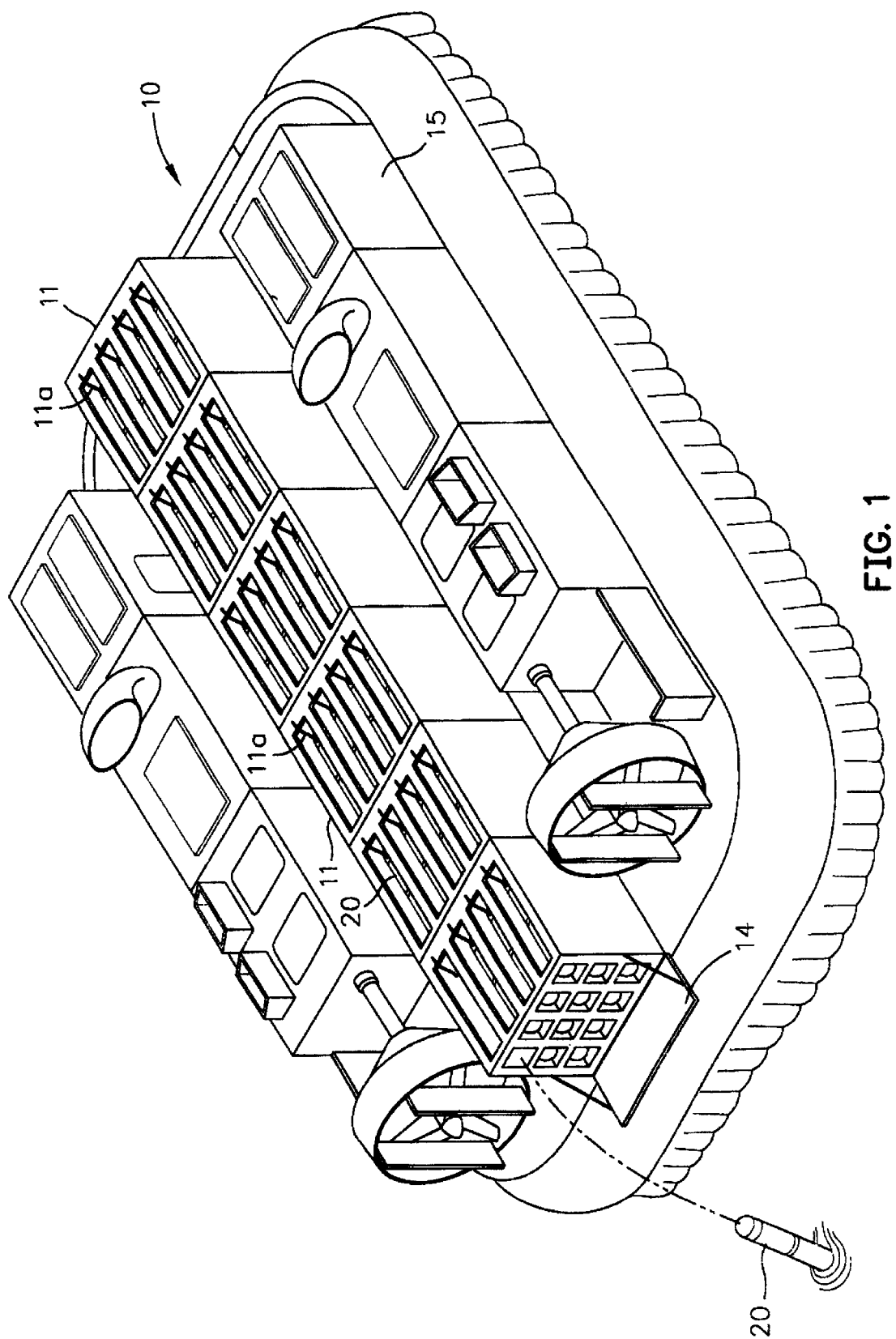
FIG. 1 isometrically depicts a high speed air-cushion craft transporting and deploying mines while substantially simultaneously recording their deployed locations with GPS equipment in accordance with this invention.

Referring to FIG. 1 of the drawings, high speed aircushion vehicle 10 is transporting a large quantity of mines 20 stacked on high volume mine laying rack 11. Rack 11 is longitudinally displaceable on rails 18 and mechanically cooperates with securing means 11a, to drop one or more mines 20 at a time over off-loading ramp 14 into the water. The large quantity of mines 20 might weigh up to many thousands of pounds. High speed air-cushion vehicle 10 is an ideal platform for transporting and deploying mines 20 since it has high speed and large cargo carrying capacity. High speed air-cushion vehicle 10 is capable of speeds up to 50 knots; it has GPS marking and recording ability onboard in its control center 15; because it hovers on an air cushion, its platform has inherent survivability from underwater blast; its design, includes a large deck area having an existing sweep deck ramp and crane to provide multi-mission capability; it is equipped with electrical power at −28 VDC and 400 Hz for many different uses; it has an established logistics system. These features make it ideally suited for laying dissimilar sea mines at high rates.

Figure 2:
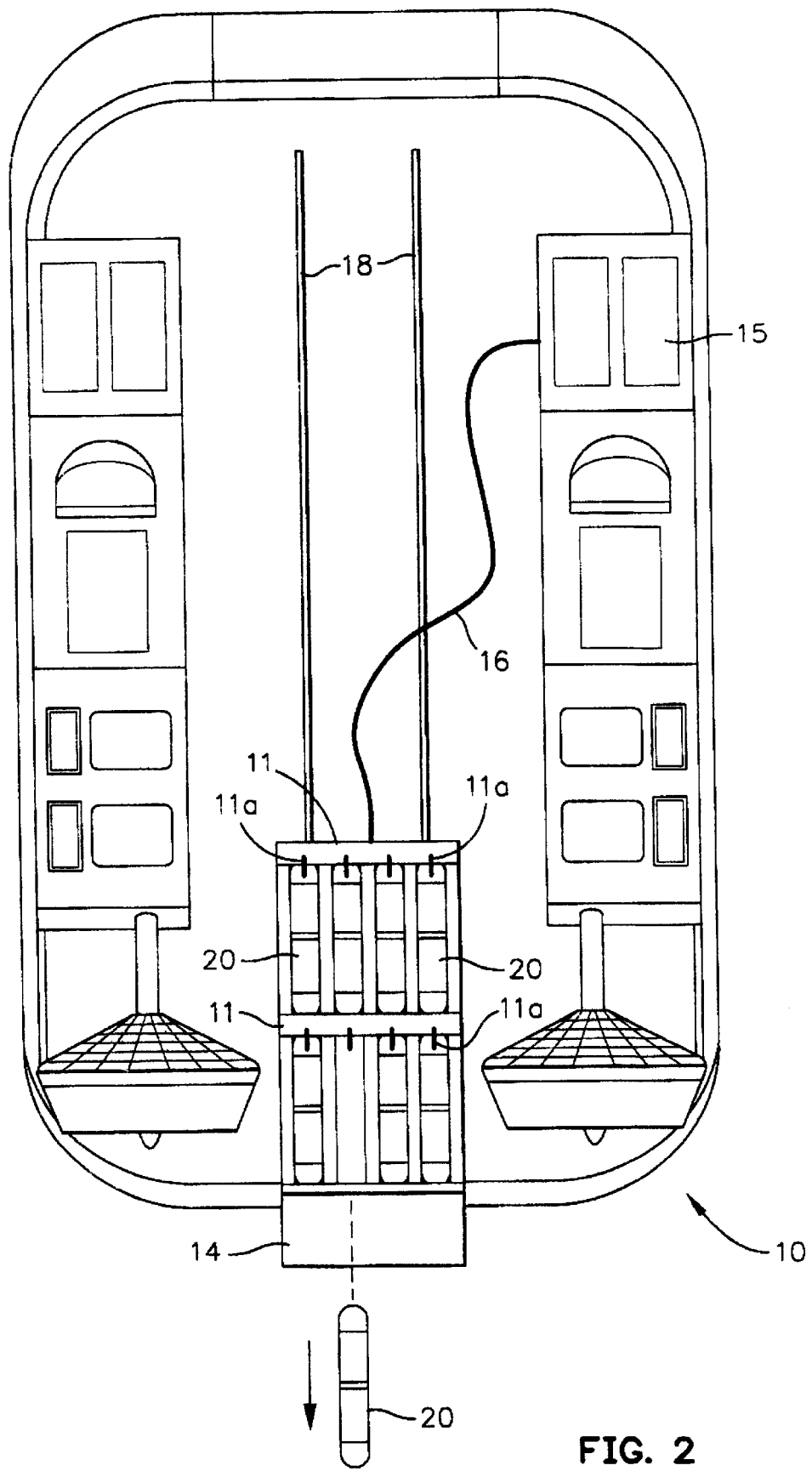
FIG. 2 is a top view of the air cushion craft offloading mines and substantially simultaneously marking their locations with GPS equipment in accordance with this invention.

Rack 11 may be provided with rollers (not shown) resting on a pair of rails 18 mounted on deck 13. Rack 11 may be further provided with a plurality of securing means 11a, such as suitable retaining latches or other suitable mechanisms that engage or otherwise secure mines 20. FIGS. 1 and 2 schematically show securing means 11a being an appropriate electromechanical latching mechanism located on the upper surfaces of rack 11 and structure associated with mines 20. This schematic representation is only for the purpose of demonstrating this portion of this inventive concept. Securing means 11a could be located in a number of different places and be differently configured so long as each securing means permits a selective disengagement of an interconnected mine 20 when an appropriate signal is fed to it via RF link or cable 16. Each securing means 11a thereby secures each mine 20 onboard high speed air-cushion vehicle 10 until an appropriate signal from control center 15 reaches it via RF link or cable 16. When the appropriate signal is received, mine 20 is disengaged and it is deployed as explained below.

Mines 20 on rack 11 may be selectively displaced by gravity if rails 18 are inclined, or by an electric motor-driven mechanism (not shown) that displaces rack 11 on rails 18 when appropriate control signals from control center 15 are transmitted over RF link or cable 16. The control signals from control center 15 either release rack 11 or provide sufficient power to displace it sufficiently to drop the intended number of mines 20 from rack 11, past off-load ramp 14, and into the water. If desired, parts of the structure of rack 11 may also be dropped overboard as mines 20 are laid so as not to interfere with the deployment of mines 20 which are to be laid later. Sequences of control signals over RF link or cable 16 can effect the deployment of mines in selected patterns as determined by the operational scenario being followed. Mines are thereby rapidly and accurately emplaced throughout a predetermined zone to create an underwater minefield and simultaneously the minefield is accurately mapped by onboard GPS equipment.

The sea mines emplaced by high speed air-cushion vehicle 10 may be so modified to arm upon their release from rack 11 or after a predetermined time has elapsed. Arming also may be accomplished possibly by pulling attached arming lanyards and/or subsequent submergence of the mines in the ocean to effect actuation by suitable pressure switches. Target detection devices in these mines may then be activated to further arm the mines to ready them for the impetus necessary to actuate the warheads for response to hostile encroachment. Minefields consisting of different mines can be rapidly laid and their locations marked by high speed air-cushion vehicle 10. Shallow water bottom mines, moored contact mines, homing mines, etc. are adaptable to being quickly deployed and mapped in accordance with this invention.

In an operational scenario high speed air-cushion vehicle 10 is loaded with significant quantities of mines 20 stacked on rack 11. It rapidly goes to the zone where a minefield is to be laid. High speed air-cushion vehicle 10 has both speed and configuration that provide three immediately apparent advantages. It reduces exposure to possible unwanted surveillance; it decreases the chance of damage from underwater explosion of an uncharted mine, for example; it may simply outrun some homing torpedoes coming from enemy defence forces or barrier mines. In addition, high speed air-cushion vehicle 10 presents little, if any, structure beneath the water's surface that could interact with a contact mine, and the acoustic signature radiated from high speed air-cushion vehicle 10 is not likely to detonate some acoustically influenced mines.

When high speed air-cushion vehicle 10 reaches the area where the minefield is to be laid, GPS equipment in control center 15 indicates this fact to the onboard crew. The crew or computer controlled navigational gear sets high speed air-cushion vehicle 10 on course into the area. The speed of high speed air-cushion vehicle 10 need not be slowed down at this point since the accuracy of mapping the laid mines 20 according to this invention is not adversely influenced by the speed of high speed air-cushion vehicle 10.

Appropriate control signals from control center 15 are fed over RF link or cable 16 to suitably disengage selective ones of mines 20 from rack 11 and securing means 11a. Disengaged mines 20 roll off off-load ramp 14 and into the water, see FIG. 2. High speed air-cushion vehicle 10 continues to move at high speed through the area being mined. Predetermined numbers of mines 20 are dropped in a pattern or sequence as determined by the control signals. As each mine 20 is so deployed, a suitable sensor (not shown) initiates GPS equipment in control center 15 to mark and record each location.

After the initial run through the area, high speed air-cushion vehicle 10 turns and makes parallel runs or whatever tracks that are necessary to complete laying the minefield. During these additional runs, appropriate control signals from control center 15 are fed over RF link or cable 16 and cause the appropriate actuations to off-load and deploy mines 20. Substantially simultaneously, GPS equipment continues to mark and record the deployment of each mine 20 in the minefield. Throughout the laying of the minefield, GPS equipment interfaces with navigational and steering gear to assure appropriate maneuvering and accurate placement.

Figure 3:
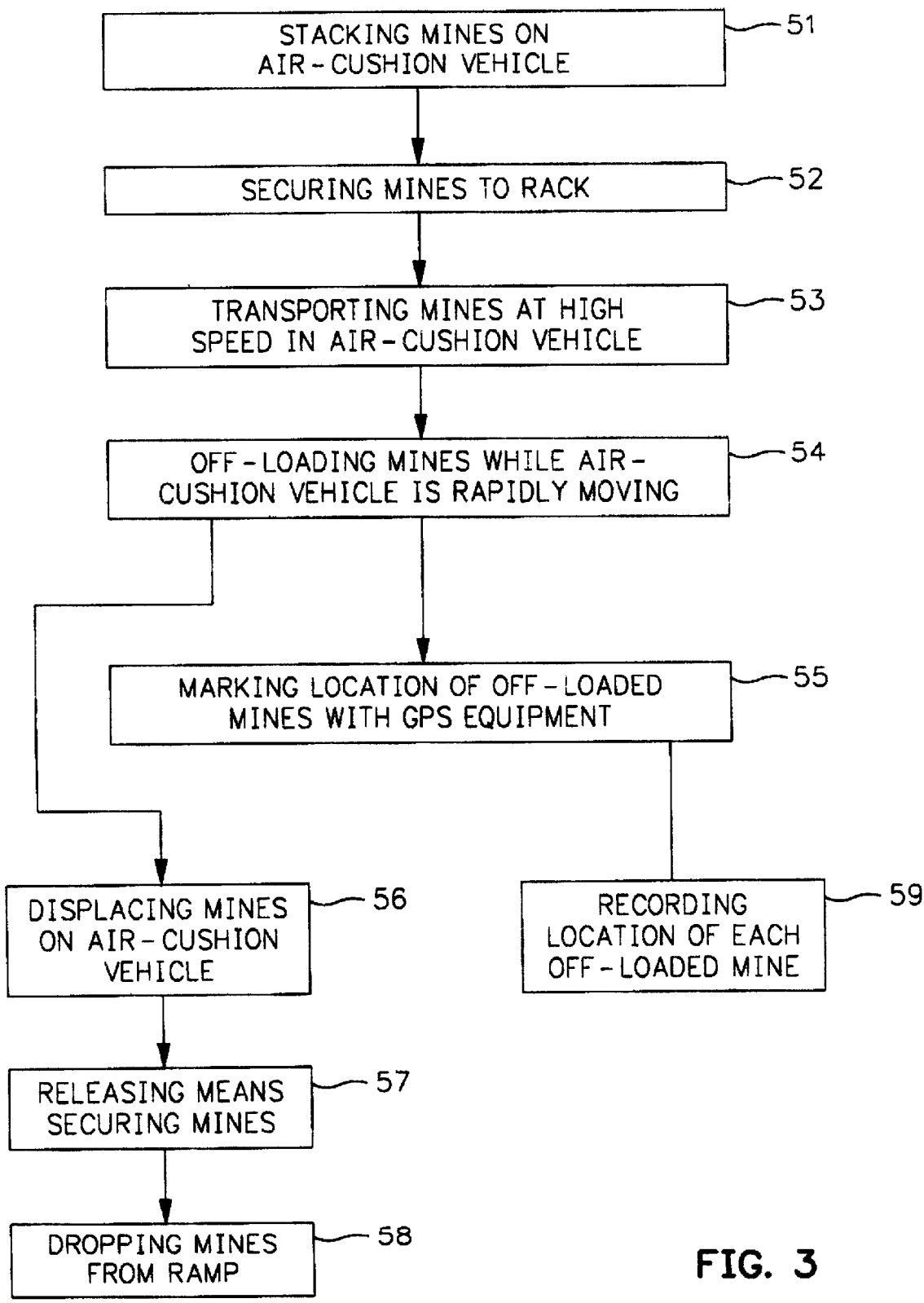
FIG. 3 is a block diagram of the method of this invention.

Referring to FIG. 3, the method of laying mines in water calls for stacking 51 mines 20 on rack 11 on air-cushion vehicle 10 and securing 52 mines 20 with securing means 11a. Transporting 53 mines 20 proceeds at high speed across the water in air-cushion vehicle 10 to the area to be mined. After the high speed transit to the area, air-cushion vehicle 10 effects off-loading 54 of mines 20 from it and into the water while it is rapidly moving. Substantially simultaneously with off-loading 54, marking 55 locations of off-loaded mines 20 with onboard GPS equipment occurs. Off-loading 54 includes displacing 56 mines 20 to the rear of air-cushion vehicle 10 and releasing 57 securing means 11a which secure each mine 20. Off-loading 54 also includes dropping 58 mines 20 from offloading ramp 14 of air-cushion vehicle 10 while rapidly moving.

The method also provides for recording 59 the location of each off-loaded mine 20 with GPS equipment. Marking 55 and recording 59 with GPS equipment occur substantially simultaneously with off-loading 54. Off-loading 54 disposes mines 20 in a predetermined pattern and recording 59 logs the location of each off-loaded mine 20 in the pattern.

The herein disclosed apparatus for and method of laying mines from a rapidly moving air-cushion vehicle and accurately marking their locations with GPS equipment increase the precision of mine emplacement, increase the accuracy to which the minefield is mapped, increase the speed at which a minefield can be created, free up air assets for other critical missions, and provide a means to accurately mine minefields already in place. The apparatus and method may also be utilized to rapidly release various types of ordnance such as: sonobuoys, mine countermeasures, seal weapon systems, etc.

In accordance with this invention mines can be emplaced at speeds and rates much greater than conventional surface ships. In accordance with this invention high speed air-cushion vehicle 10 has speed that makes it less vulnerable to attack than conventional craft during operations, and it is less vulnerable to other mines it may encounter during a mission. The GPS found on high speed air-cushion vehicle 10 records the precise location of each mine as it is released from high speed air-cushion vehicle 10 ensuring an accurate and detailed record of the minefield. High speed air-cushion vehicle 10 has much greater lift capability than aircraft used in mining missions, and therefore, can deliver a much larger payload per sortie (under all weather conditions) in the creation of the minefield. High speed air-cushion vehicle 10 is on the water's surface and, as such, can emplace mines much more accurately than an aircraft dropping them from altitude. This increase in delivery precision is at least, 100%. High speed air-cushion vehicle 10 running at normal operating speeds, has reduced detectable signature over other surface craft and, due to its speed, is invulnerable to certain enemy mine functions at depths greater than 40 feet. The unexpected benefit is that this invention can accurately mine enemy minefields, or areas beyond enemy minefields, for various expeditionary uses.

It should be readily understood that many modifications and variations of the present invention are possible within the purview of the claimed invention. It is therefore to be understood that within the scope of the appended claims the invention may be practiced otherwise than as specifically described.

We claim:

1. A method of laying a predetermined spacing and pattern of mines in an area of water from an air cushion vehicle and recording the location of each mine with GPS equipment comprising the steps of:

stacking mines on a rack on an air-cushion vehicle;

securing said mines to said rack with securing means;

transporting said mines at high speed in said air-cushion vehicle to and across an area of water to be mined;

displacing said mines to the rear of said air-cushion vehicle to an off-loading ramp;

off-loading said mines from said off-loading ramp on said air-cushion vehicle into said area of the water in a predetermined spacing and pattern of mines, said step of off-loading being at said high speed by said air cushion vehicle and including disengaging said securing means from said mines; and marking the location of each of said off-loaded mines in said predetermined spacing and pattern of mines with GPS equipment.

2. A method according to claim 1 further comprising the step of:

repeating said step of transporting mines in additional high speed runs across said area to complete said step of off-loading in said predetermined spacing and pattern of mines and said step of marking with GPS equipment the location of each off-loaded mine.

3. A method according to claim 2 in which said step of off-loading further comprises the step of:

dropping said mines from said off-loading ramp at the rear of said air-cushion vehicle at said high speed across the water, said step of dropping being to dispose said mines in said predetermined spacing and pattern of mines each having its location marked by GPS equipment.

4. A method according to claim 3 further comprising the step of:

recording the location of each off-loaded mine in said predetermined spacing and pattern of mines with GPS equipment, said steps of marking and recording with GPS equipment occur substantially simultaneously with said step of off-loading.

5. An apparatus for laying a predetermined spacing and pattern of mines in an area of water and recording the location of each mine with GPS equipment comprising:

an air-cushion vehicle to transport mines at high speed to and across an area of water, said air cushion vehicle having an off-loading ramp at the rear to drop said mines therefrom;

means for displacing said mines toward said off-loading ramp;

means for off-loading said mines from said off-loading ramp into said area of the water in a predetermined spacing and pattern of mines, said off-loading being by said aircushion vehicle as it travels at said high speed; and GPS equipment on said air cushion vehicle to mark and record the location of each of said off-loaded mines in said predetermined spacing and pattern of mines as they are offloaded.

6. An apparatus according to claim 5 wherein said off-loading means includes a rack on said air-cushion vehicle to stack said mines thereon prior to off-loading from said ramp and means for securing said mines on said air cushion vehicle prior to off-loading.

7. An apparatus according to claim 6 in which marking and recording of the location of each of said off-loaded mines in said predetermined spacing and pattern of mines with GPS equipment occur substantially simultaneously with off-loading each of said mines.

* * * * *